Patented Sept. 19, 1933

1,927,116

UNITED STATES PATENT OFFICE 1,927,116

ELECTROCHEMICAL PROCESS

Colin G. Fink, New York, N. Y., and Thomas H. Wilber, Bridgeport, Conn., assignors to The Bullard Company, a corporation of Connecticut No Drawing. Application January 25, 1933
Serial No. 653,480

5 Claims. (Cl. 204—7)

It is among the general objects of the present invention to provide an electro-chemical process for controlling the valence of multi-valent ions of an electrolyte.

It is common in electro-chemical processes to find the useful functions thereof jeopardized by the presence of hostile ions, the concentration of which may build up to such an extent as to inhibit completely the desired action. Frequently, the undesirable ions are those of a particular valence of a multi-valent substance, another valence of which may be harmless or even valuable to the process. In many electro-chemical processes hostile ions may be formed at the electrode surfaces by valence changes brought about by the oxidation or reduction of the ions which takes place on the surface of the electrodes. Such oxidation or reduction is objectionable in many processes, not only on account of the disturbing effect of the hostile ions formed, but also on account of the excess current consumed merely in reversing these valence changes at the opposite poles, and on account of undesirable side reactions which may also occur. For instance, in the electrolytic operation of aqueous solutions of salts such as those of iron, nickel, cobalt, copper and others, it has been found that the cations of low valence are oxidized to cations of higher valence at the anode due to their diffusion to and contact with atomic oxygen formed at the surface of the anode. The presence of ferric ions will deter the deposit of copper at the cathode even at low percentages of concentration. Again, in electro-chemical pickling and cleaning processes, operating on iron or steel, the electrolyte builds up in ferric or ferrous ion concentration, the former being deleterious while the latter may reach a high concentration in the bath without seriously affecting the efficiency of the action.

Conversely, in the regeneration of spent chrome tanning solutions it is essential that a preponderance of the chromium ions present be converted to and maintained in a higher valence state. Therefore, in such a process, it is desirable to establish conditions which tend to prevent the reduction of the higher valence ions while in the cleaning process referred to the reverse is true, it being desirable to inhibit oxidation.

The injurious effect on the efficiency and effectiveness of electrolytic processes due to the presence of ions of undesirable valences has long been recognized and its serious effect on the operating cost of such processes has long been felt.

Various methods have been suggested for preventing inroads upon the efficiency of an electrochemical process caused by the presence of hostile ions. For example, an electrolyte which contains both -ous and -ic ions frequently can be purged of either of these ions by selective crystallization. To accomplish such results requires the use of expensive equipment and necessitates accurate and critical temperature and chemical supervision. We are also familiar with the process of introducing sulphur dioxide gas into an electrolyte to reduce ferric ions to ferrous ions. This process also has many disadvantages including high cost, difficulty of control, and the formation of undesirable by-products.

Since the reduction or oxidation of ions takes place at, or in close proximity to, the cathode or anode respectively, such reactions can be minimized by retarding the diffusion of ions into the electrode zone wherein such undesirable reactions would normally take place. Thus an ideal method of avoiding the deleterious effects of hostile ions is by the prevention of such diffusion. Such an ideal is attempted in laboratory experiment by use of an electrolytic cell in which a chemically inert porous diaphragm prevents such diffusion. This method is exemplified by the use of a porous cup. However such cups have the inherent disadvantage of increasing the electrical resistance of the cell, have a tendency to clog, are usually fragile and expensive and present numerous difficulties in commercial practice.

We have discovered a process which partakes of the virtue of the porous cup method in that diffusion of the ions will be restricted thus to maintain physical separation but which is wholly free from the inherent disadvantages of present-day diaphragm method. Our process utilizes an electrode which will automatically form and thereafter maintain an integral inert protecting and sheathing diaphragm film such as to preclude the mechanical diffusion to the active surface thereof of ions, changes in the valence of which is objectionable. Such a film is automatically formed and maintained, does not materially increase the consumption of electrical energy, does not appreciably reduce the space in the cell, requires no auxiliary structure for its support and avoids the necessity of any cleaning or handling of the electrode.

Our process contemplates the use in an electrically energized solution of an electrode formed of a substantially insoluble material preferably of a silicon alloy of iron or cobalt such as the thirteen percent silicon-iron alloy commonly known in the trade as "Duriron." The alloy electrode has upon its surface a chemically inert thin enshrouding film of low electrical resistance which prevents the mechanical diffusion of ions to its surface where oxidizing or reducing action will take place. An examination of the silicon iron electrode surface clearly demonstrates the presence of this porous film, direct analysis of which has shown it to be composed substantially of silicon dioxide. The film may be formed by a non-penetrating anodic attack of the relatively insoluble material which leaves as a residue the porous film of silica which retards ion diffusion therethrough.

While ferro-silicon electrodes are usually referred to as insoluble and while they are relatively so in many electrolytes and under various ranges of current density, we have found that the film will be formed when the electrode is subjected to anodic attack in an acid electrolyte and under the influence of substantial current density for instance as in the cleaning process hereinafter mentioned where a 10% acid solution is used and a current density of 40 to 100 amperes per square foot is applied. Obviously the film formation is not limited to the specific acid concentration nor current density referred to but since it appears that the film formation is due to a surface solution of the iron of the electrode and an oxidation of the silicon it appears that such formation would probably not occur in an electrolyte which precluded oxidation of the electrode nor would it appear that the film would be formed with the use of weak current densities. It may also be noted that very high current densities such as used in chromium plating would probably blast the film from the electrode should such be formed.

In the operation of the electrode it appears that the atomic hydrogen and oxygen are converted to molecular gas which is liberated under this diaphragm crust, inhibiting direct contact of such atoms with the ions outside the diaphragm. In place of a thin film of silica, other porous films which are chemically inert and have no catalytic effect may be used. The electrode film may be produced in a separate cell before use, however in the cleaning process hereafter referred to the electrode is used as anode and the film will therefore be automatically self forming and sustaining.

The invention is broadly applicable for controlling either anodic or cathodic reactions as for regenerating a spent solution. A specific practical illustration is found in its use as an improvement over the Bullard-Dunn process for cleaning metal as set forth in Patent No. 1,775,671, and co-pending application Ser, No. 618,403, filed June 20, 1932.

In the Bullard-Dunn process the presence of ferric ions tends to inhibit the deposition of the characteristic protective metal film on the cathode, the absence of which leads to pitting or etching of the work. In addition to this objection to the presence of such high valence ions their presence also increases the current consumption of the process, lengthens the time cycle required and may interfere with the solubility of the metal to be deposited. Such difficulties can be avoided by the present process in which the film forming alloy anode retards the mechanical migration of the ferrous ions to the surface of the anode where they would otherwise come in contact with the atomic oxygen and be converted to the ferric state.

In this particular form of the present invention the work, such as scaled iron or steel, is made cathode in an acid electrolyte containing ions of a metal to be deposited. When high current density, such as from 40 to 100 amperes per square foot, is applied a copious liberation of hydrogen ensues at the base metal of the work surface thus blasting off the scale and concurrently the work is protected by the deposition thereon of a film of the selected protecting metal.

The electrolyte can be composed of an aqueous solution of a mineral acid. On account of cheapness and availability sulphuric acid is preferred, approximately ten percent solution by volume giving satisfactory results. Various metals may be used for the work protecting film. For example lead, tin, copper, cadmium and zinc. When lead is used it may be introduced into the electrolyte by adding lead salts, or some or all of such salts may be formed by the use of lead anodes. Since it is well known that lead anodes become more or less insoluble in an electrolyte composed only of sulphuric acid and water, when such anodes are used, a chloride or some other anode corroding substance is added to the electrolyte to accelerate the dissolution of the lead anodes. Lead peroxide, a catalyst favoring oxidation, may be formed on the surface of the lead anodes so used. Therefore, it is desirable to use only a sufficient lead anode area to furnish the small amount of lead salts needed for the process. The remaining anode area, needed for the electrification of the bath, is provided by a sufficient number of additional anodes composed of the insoluble material. These insoluble anodes act to restrain the oxidation of ferrous ions formed by the dissolution of removed scale, thus maintaining the efficiency of the electrolyte.

When tin is used for the work protecting film, it may also be introduced into the solution through the use of tin salts or through the use of a sufficient tin anode area to maintain in the solution the required metallic tin content. Tin anodes are very readily disintegrated in an electrolyte composed of an aqueous solution of sulphuric acid with or without conducting salts and therefore when tin anodes are employed to produce the tin salts desired, it is not necessary to include, as an ingredient of the electrolyte, any other mineral acid or chemical for the purpose of aiding anode corrosion. The ready solubility of tin anodes enables us to employ a minimum area of tin anode surface and a preponderant area of anode surface composed of the silicon iron alloy previously described. A further characteristic feature of the behavior of tin anodes is that in place of a catalytic film favoring oxidation as may be formed on lead anodes the tin may form metastannic acid which will assist the diaphragm film of the insoluble anodes in preventing ion hostile diffusion. In our process, therefore, using tin as the protective metal, conditions favoring the formation of hostile ions are reduced to a minimum.

From the foregoing it will be seen that the invention is broadly applicable to various electrochemical processes and contemplates the use not only of film forming insoluble anodes alone, but the combination of soluble and insoluble anodes. Obviously numerous methods of applying the invention may be resorted to without departure from the spirit or scope of the invention as outlined in the appended claims.

Having thus set forth the nature of our invention, what we claim is:

1. The method of maintaining ions of an electrolyte at a preferred valence, in an electrolytic process which tends to change ion valences, comprising anodically forming in situ on a silicon alloy electrode an integral, ion-diffusion-restraining silica containing, surface film and thereafter maintaining said film during the electrolytic process.

2. In a electrolytic process including the use of an electrode at which valence changes of the ions of the electrolyte occur, the maintenance on an opposed electrode of silicon alloy of an integral silica-containing ion-migration-restraining film formed in situ thereon by anodic attack for the purpose of preventing converse valence changes in the ions of the electrolyte.

3. In a cathodic electrolytic cleaning process the method of preventing excessive ferric ion content of the electrolyte which consists in using a silicon alloy anode upon which is maintained an integral, inert, silica-containing diaphragm, formed in situ thereon, by anodic attack for the purpose of inhibiting ferrous ion oxidation.

4. The method of inhibiting the deleterious effect of hostile ions in an electrolytic solution, comprising the subjection of the electrolyte to the action of a silicon alloy electrode having on the surface thereof a continuously-maintained, anodically-formed integral, silica-containing ion-diffusion-restraining, surface film.

5. A process as set forth in claim 1, in which the surface film is formed as an incident to the electrolytic process.

COLIN G. FINK.
THOMAS H. WILBER.